June 8, 1971 R. G. HUGHES 3,583,054

STACK DRILLING AND PINNING MACHINE

Filed Dec. 5, 1968

3 Sheets-Sheet 1

INVENTOR.

R. G. Hughes

BY Alfons [signature]

Attorney

INVENTOR.
R. G. Hughes
BY Alfons Puishes
Attorney

June 8, 1971 R. G. HUGHES 3,583,054

STACK DRILLING AND PINNING MACHINE

Filed Dec. 5, 1968

3 Sheets-Sheet 3

INVENTOR

R. G. Hughes

BY Alfons Puishes

Attorney

United States Patent Office 3,583,054

Patented June 8, 1971

3,583,054

STACK DRILLING AND PINNING MACHINE

Richard G. Hughes, 1690 Plymouth St., Mountain View, Calif. 94040

Filed Dec. 5, 1968, Ser. No. 781,328
Int. Cl. H05k *13/00*
U.S. Cl. 29—203 5 Claims

ABSTRACT OF THE DISCLOSURE

A pair of combination drill and pin presses are mounted vertically on a machine frame above a work table. A novel screw and pawl combination provides for adjusting and varying the horizontal spacing between the two sets of presses and insuring that this spacing will be accurately maintained. This, in turn, insures that when drilling through a stack of board and pinning them together preparatory to further drilling operations each stack will be uniformly and interchangeably pinned together, which is of utmost importance to subsequent drilling operations such as in the manufacture of printed circuit boards.

BACKGROUND OF THE INVENTION

In the manufacture of printed circuit boards it is usually necessary to drill a plurality of holes through a stack of what amounts to a sandwich of plastic boards and thin copper sheets. These are held in proper relative horizontal position with respect to one another by means of vertical pins, sometimes referred to as tooling pins, inserted in holes drilled through the stack. These pins not only serve to hold each individual board in proper relation to the others but also to properly locate and position the stack of boards under the drill or drills which drill the many holes for the circuit.

It is well known to those skilled in the art that a high degree of precision is required in these operations in order that each printed circuit board be uniform and interchangeable insofar as the location of these holes is concerned. Previous practice has in general consisted of drilling a hole through a stack of boards, close to one edge and pressing a pin through it. A second hole is located near an opposite edge by means of templates or other devices and a second pin pressed in. The stacks thus pinned together are then sent to the next operation where the many holes are drilled through, using the pins to position the stacks relative to the drills.

It is evident that using such a manual method of spacing the pins introduces inaccuracies and lack of uniformity which in turn causes rejections of the finished product. Use of templates or jigs has not proved satisfactory, particularly because of problems of angularity and cumbersomeness.

SUMMARY

I have discovered that by using a machine having the construction of my invention and following the steps disclosed herein I am able to greatly simplify and expedite the stack drilling and pinning operation and at the same time insure uniformity of each stack. The latter is sometimes referred to as "repeatability" by those skilled in the art. By this, it is meant that while the actual given dimensions between holes need not be held to a high degree of precision, the variation from any given dimension in successive boards must be very minimal, or in other words, the geometry must be uniform as set forth above.

In my invention I utilize two drills and two pin presses, one drill and one press comprising a set or pair which is symmetrical in every respect to the other. I provide a table which is adapted to hold a stack of boards and move them in a horizontal slide or rail so that their spacing may be varied to suit different sized boards.

To insure constant spacing between drills and consequently between pins, I utilize a horizontal screw which parallels the slide and engages the housing of my drills by means of a pawl-like mechanism. Once this is set for a given stack of boards it is evident that all subsequent stacks will have their holes and consequently their pins exactly the same distance apart.

After drilling two parallel holes simultaneously through a stack, by means of my twin drills, I move the table horizontally a distance equal to the distance between the center lines of my drills and presses. I then insert my pins simultaneously by means of my twin presses.

The foregoing construction and method of my invention will become evident to those skilled in the art from the more detailed description which follows.

DESCRIPTION OF A PREFERRED EMBODIMENT

Figures 1, 2:
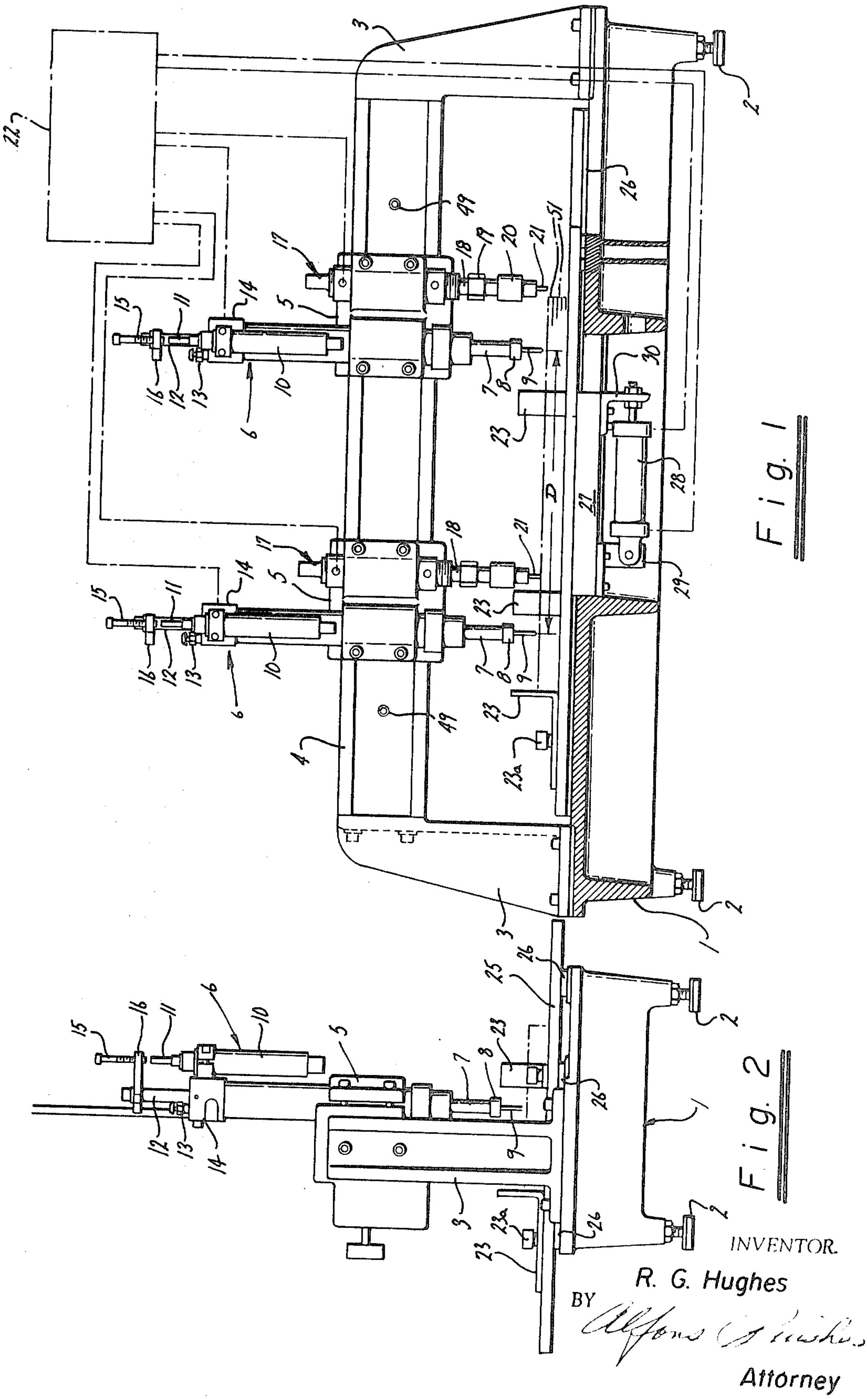
FIG. 1 is a front elevation of the machine of my invention, partially in section.
FIG. 2 is a side elevation of the machine of my invention.

Referring now to the drawings and particularly first to FIG. 1 and FIG. 2, there is shown the base 1 of my machine supported by adjustable feet 2. The frame 3 comprises two vertical stanchions which are joined by horizontal beam 4 which serves also as a slide member. Slideably mounted on beam 4 is a pair of twin drill and pin press housings 5. Each of the housings 5 serve to support drill heads 6 which comprise a combination air turbine and cylinder and may be of any standard commercial construction such as the "Bant-A-Matic" manufactured by the Aro Corporation of Bryan, Ohio.

The drill heads 6 are equipped with spindles 7 on which are mounted collet chucks 8. The latter serve to hold the drills 9 as in any conventional drill press. Mounted adjacent and parallel to the drill heads 6 are dashpot cylinders 10 equipped with plungers 11. These serve to control the vertical movement of drill plungers 12 and consequently the vertical movement of spindle 7. Variations in motion may be effected by means of height adjusting screws 13 and stroke adjusting screws 15. Clamps 14 and 16 serve to hold the foregoing parts in their proper position and vertical alignment as shown.

Also mounted on housings 5 are pin presses 17, each pin press being adjacent and parallel to its corresponding drill press. The former are essentially pneumatically operated presses, also available commercially and are comprised in general of the following important elements. Pin press ram 18 supplies the vertical motion when actuated by an air supply as described more fully below. Pin press chuck 19 is mounted on ram 18 and is disposed to hold a magnetic chuck 20 in position. The magnetic chuck 20 holds pin 21 in position prior to its being inserted in the drill holes, also as described more fully below. The sequence of operations of these two presses are controlled automatically by a control system 22, as are also the sequence of operations of the other parts of my machine.

This device is likewise commercially available and may be of the type known as a "Pneumatic Logic Control Circuit."

Figure 3:
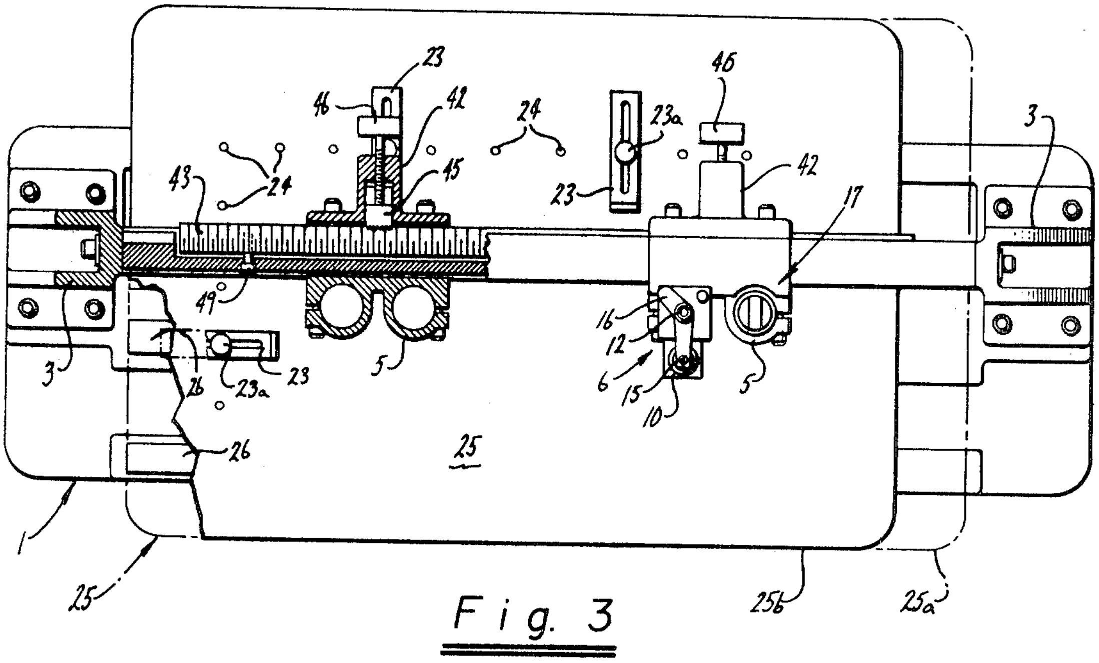
FIG. 3 is a top view, partially in section, showing especially the method and device for positioning my drilling heads.

Positioned on the top surface of work table 25 are angle stops 23 secured by bolts 23*a* which are disposed to engage holes 24 located in table top 25 which may be seen also in FIG. 3. These serve to hold my stacks of boards in position while they are being drilled and pinned and the arrangement disclosed provides for holding of stacks of different dimensions as in usual machine shop practice.

Figure 4:
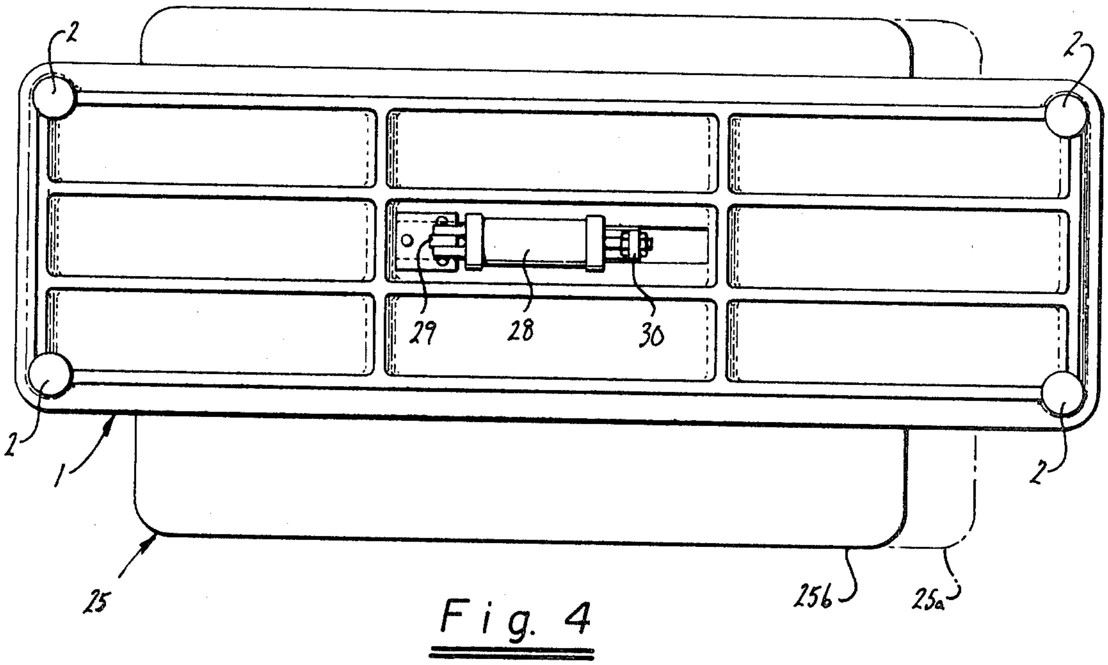
FIG. 4 is a bottom view looking under the table of my machine, showing the table movement.

Work table 25 is arranged for motion in a horizontal direction to assume successively a first position for drilling and a second position for pinning. This may best be seen on FIG. 4 in which 25*a* shows the work table in position for drilling and 25*b* shows the work table in position for driving of the pin. To accomplish this I provide slides 26 for my work table 25 to ride upon and a key 27 which engages it. Pneumatic ram 28 is fixedly positioned to machine base 1 by means of bracket 29 and to the work table through key 27 by means of bracket 30. The motion of the ram 28 and consequently that of table 25 is controlled also by my master control system shown diagrammatically at 22.

Figures 5, 6, 7, 8:
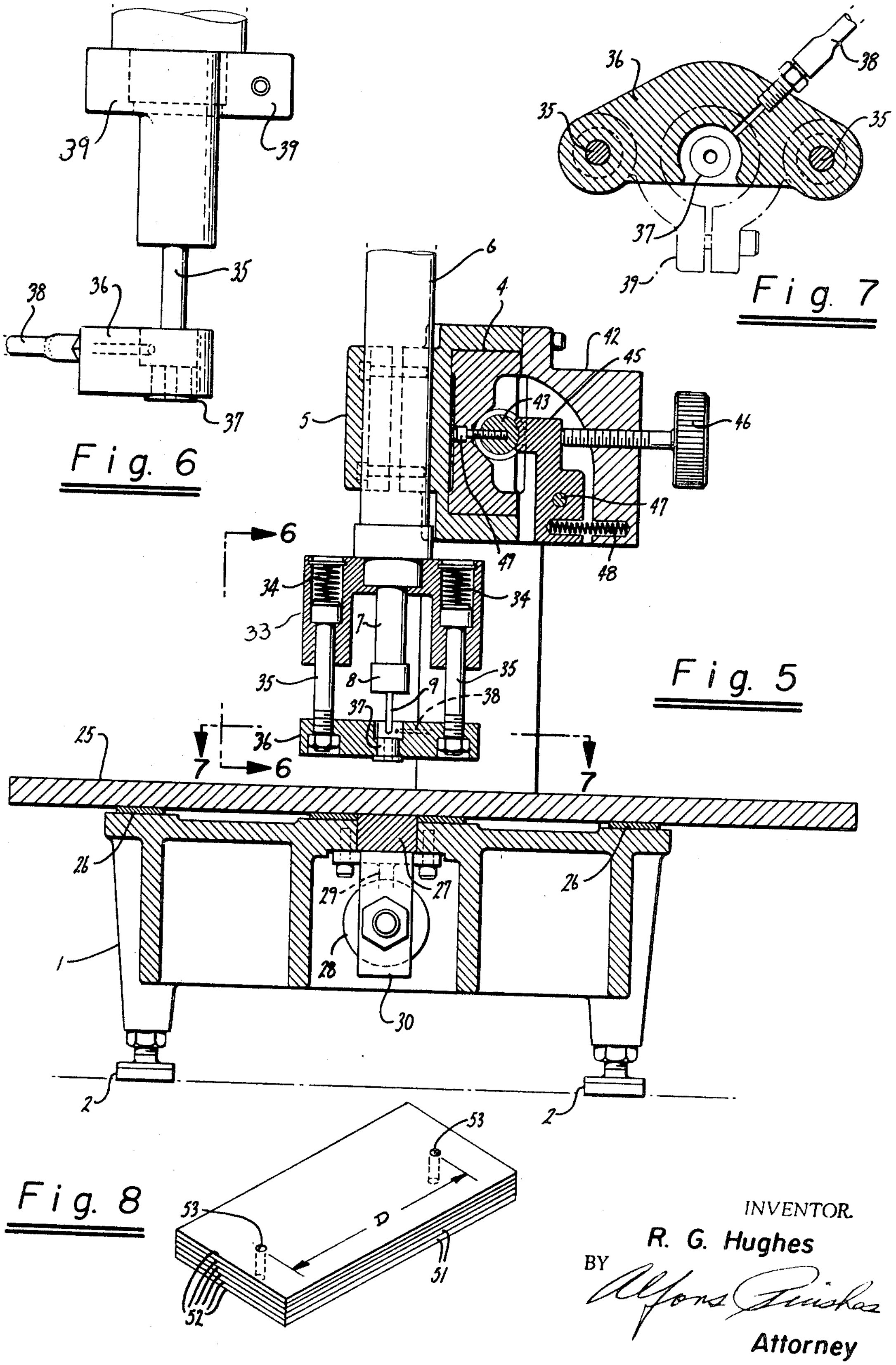
FIG. 5 is a partial cross-section through my machine.
FIG. 6 is a view along the line 6—6 of FIG. 5.
FIG. 7 is a view along the lines 7—7 of FIG. 5.
FIG. 8 is an isometric view of a stack of boards after drilling, showing drill holes for pins.

Referring now more particularly to FIG. 5, there is seen work holder frame 33 which is mounted on drill heads 6 by means of clamp 39. For details of this element of my invention reference should be had also to FIG. 6 and FIG. 7.

In work holder frame 33 are positioned springs 34 which engage plungers 35. Plungers 35 in turn carry plate 36. Positioned in the center of plate 36 is bushing 37 mounted so as to be concentric with drills 9. This bushing may be made of a material such as nylon and serve to guide drill 9 down through work holder plate 36 when the latter is positioned on top of a stack of boards. Communicating with the opening in plate 36 which accommodates bushing 37 is a vacuum connection 38 which in turn communicates with a vacuum source not shown and serves to remove the chips formed by the action of drill 9 on the boards being drilled. This is especially important since a principal application of my invention is in the preparation of printed circuit boards. The stacks being drilled through in this application comprise alternate layers of thin plastic slabs sandwiched in between thin sheets of copper. This may be seen diagrammatically in FIG. 8 in which 51 represents the plastic slabs and 52 the thin copper sheets. The drill holes are shown at 53. It should be evident to those skilled in the art that when drilling through an assembly such as this, the problem of efficient chip removal becomes very important.

Referring now more particularly to FIG. 3 and FIG. 5, there is seen the positioner mechanism of my invention which forms an important part thereof. This comprises essentially positioner housings 42 which serve to carry positioning lead screw 43. Positioner lead screw 43 is secured to slide member 4 by means of retaining screws 49. Positioner lead screw 43 does therefore not revolve but remains stationary. It may be a helical screw of any suitable configuration and have a pitch of approximately ⅛ inch and is disposed to engage with positioning dogs or pawls 45 in a manner similar to a ratchet and pawl arrangement. Positioning thumb screw 46 serves to engage positioning dog 45 which in turn is mounted for rotation around pin 47 and is engaged by spring 48. It should now be evident to those skilled in the art that by manipulation of thumb screw 46, positioning dog 45 may be made to engage and disengage with positioning lead screw 43 and thus provide for positively establishing the relative positions of the two twin press housings at any predetermined value. This, in turn, insures a constant and repeatable value for the distance between the pin holes which I indicate with the letter "D" on FIG. 1 and FIG. 8. By the use of this mechanism, the precision of the machined parts and particularly that of lead screw 43 becomes unimportant in maintaining a precise consistency of the dimension D, since my machine insures that D will be the same for each batch or stack of boards, and the fact that it might vary a little from any one set definite dimension is unimportant just so long as it is the same each time. This further explains the significance of the term "repeatability" which I have described above.

OPERATION

A typical example of the operation of my invention is as follows. A stack of boards similar to that shown in FIG. 8 is nested on table 25 with the aid of angle stops 23. Pins 21 are inserted in the magnetic chucks 20 of each pin press 17. Drills 9 are inserted in collet chucks 8 of the drill presses. The relative position of the two twin drill and pin press housings is then set, although it is evident that this may be done prior to inserting the pins and drills as described above. This setting is accomplished in order to establish the critical dimension D described above. Thumb screws 46 are loosened so as to disengage positioning dog 45 from lead screw 43. The two housings are then set as closely as conveniently possible without the use of any precision instruments to establish the critical distance D. Thumb screw 46 is then tightened so as to engage positioning dog 45 with positioning lead screw 43. This setting is now positive and will govern the dimension D for any number of batches of boards.

The machine is now ready for the start of its cycle of automatic operation. This is initiated by pressing of a suitable start button, not shown, which initiates the functioning of the control system 22. The latter starts the first operation by starting the rotation of the drills in drill heads 6. These, of course, have been set as to height and stroke by means of adjusting screws 13 and 15 as previously described. Drill spindle 7 commences to rotate at a speed which may be on the order of magnitude of 1900 r.p.m. As the drills continue to rotate and advance vertically through the stack at the predetermined rate, the vacuum applied to connection 38 commences to function and removes the chips efficiently from around bushing 37. After the completion of the drill holes 53, drills 9 retract automatically in response to the control element 22 and then stop. Control element 22 then automatically puts in operations pneumatic ram 28 which moves table 25 to the pin pressing position 25*b*. It should be noted that the amount of this motion which represents the difference in position between 25*a* and 25*b* is exactly equal to the distance between the axial center lines of drill heads 6 and pin presses 17. Upon completion of this moving operation, control system 22 starts pin press 17 in operation. Pin 21 under the action of pin press ram 18 and in response to the control system 22 is then pressed into drill holes 53 which are in proper registration and position to receive them. Pin press ram 18 is then retracted again in response to control system 22, which control system likewise de-energizes magnetic chuck 20, thereby leaving pins 21 in their desired locations in holes 53 and the cycle is completed. Control system 22 then puts the machine to rest until again energized as described above.

A second stack of boards is then positioned by hand in the machine of my invention and the cycle is repeated. It should now be evident to those skilled in the art that the second and all future stacks will have the same distance D without the aid of any outside templates, jigs, precision measuring instruments, or any other means.

When it is desired to drill and pin stacks of different dimensions the angle stops 23 may be adjusted accordingly and the distance D set by means of the positioning lead screw 43 and positioning dog 45 with its attendant positioning thumb screw 46 as disclosed above.

I claim:

1. A machine for drilling through and pinning together a stack of boards superimposed upon one another comprising:

a pair of twin vertical drill presses in variable horizontal spaced relation with each other;

a pair of twin vertical pin presses, each of said pin presses being in fixed horizontal spaced relation to an adjacent one of said drill presses, all of said presses being in alignment in a vertical plane;

means for positioning said stack beneath said presses;

means for moving said stack in a horizontal plane beneath and parallel to the line of alignment of said presses;

positive means for maintaining said variable spaced relation between said presses at a predetermined distance;

a ram positioned on each of said pin presses and disposed for vertical motion;

a chuck positioned on the lower end of said ram and disposed for engaging and disengaging a pin;

whereby said pin may be inserted in holes formed by said drill presses.

2. The machine of claim 1 in which said positive means for maintaining said variable spaced relation between said presses comprises:

a stationary horizontal helical screw member, said member being positioned on the frame of said machine;

clamp members disposed to engage and support each of said combinations of said drill presses and said pin presses;

a horizontal slide member mounted on said machine frame parallel to said screw member;

means for sliding said clamp members along said slide members;

dog members mounted on each of said clamp members and disposed to engage said screw members;

means for engaging and disengaging each of said dog members from said screw member.

3. A machine for positioning drilling through and fixing the relative horizontal location of each of a stack of boards superimposed upon one another and said stack comprising one of a plurality of other identical stacks comprising:

a machine frame;

a horizontally slideable table for positioning of said stacks mounted on said frame;

a pair of parallel, vertical, rotary drill presses positioned on said frame including means for positioning said drill presses in a predetermined definitely spaced horizontal relation to each other;

a pin press in combination with each of said drill presses, each of said pin presses being spaced horizontally the same fixed distance in the same direction from its respective drill press;

means operatively connected to said drill presses whereby a pair of parallel vertical holes may be drilled through said stack;

means for moving said horizontal table a fixed and predetermined distance in a horizontal plane, said distance being equal to the distance between each of said drill presses and its adjacent pin press;

means operatively connected to said pin presses whereby pins may be pressed into said holes through said stack.

4. The machine of claim 3 in which said means for positioning said drill presses and said pin presses comprises:

a stationary horizontal helical screw member;

said member being positioned on the frame of said machine;

clamp members disposed to engage and support each of said combinations of said drill press and said pin presses;

a horizontal slide member mounted on said machine frame parallel to said screw member;

means for sliding said clamp members along said slide members;

engaging members mounted on each of said clamp members and disposed to engage said screw member;

means for engaging and disengaging each of said engaging means from said screw member.

5. In a machine comprising a vertical drill press for drilling holes through a stack of boards and a pin press for inserting pins in said holes, said boards being separated by alternate layers of thin sheet metal, the improvement comprising:

a bushing in axial alignment with the spindle of said drill press;

said bushing being disposed to press against the top of said stack while said drill press is in operation;

an aperture through said bushing communicating with a space between the drill of said press and said bushing;

vacuum means communicating with said aperture;

a ram positioned on said pin press;

a chuck positioned on the lower end of said ram and disposed for engaging said pins.

References Cited

UNITED STATES PATENTS 3,302,274 2/1967 Stoltz ---------------- 29—203

3,468,024 9/1969 Yonkers -------------- 29—203

THOMAS H. EAGER, Primary Examiner